US008647566B2

(12) United States Patent
Tsui

(10) Patent No.: US 8,647,566 B2
(45) Date of Patent: Feb. 11, 2014

(54) DEODORANT FOR TREATING SEDIMENT IN-SITU AND THE ASSOCIATED FACILITIES AND METHOD

(76) Inventor: Hak Yee Tsui, N.T. (HK)

(*) Notice: Subject to any disclaimer, the term of this patent is extended or adjusted under 35 U.S.C. 154(b) by 249 days.

(21) Appl. No.: 13/204,728

(22) Filed: Aug. 8, 2011

(65) Prior Publication Data

US 2012/0051964 A1 Mar. 1, 2012

(30) Foreign Application Priority Data

Aug. 31, 2010 (CN) .......................... 2010 1 0267965

(51) Int. Cl.
*A61L 9/00* (2006.01)

(52) U.S. Cl.
USPC ............................................................ 422/5

(58) Field of Classification Search
USPC ............................................................ 422/5
See application file for complete search history.

(56) References Cited

U.S. PATENT DOCUMENTS 4,352,590 A * 10/1982 Parker et al. .................... 405/17
4,840,729 A * 6/1989 Levine .................... 210/170.04
5,458,747 A * 10/1995 Marks et al. ................... 205/702
5,866,614 A * 2/1999 Bockowski et al. ........... 514/693
7,287,933 B2 * 10/2007 Pappa et al. ................ 405/128.5

FOREIGN PATENT DOCUMENTS

GB       2300014 A  * 10/1996 ............... E02F 3/92
WO   WO 2008062219     *  5/2008 ............... E02F 3/88

* cited by examiner

*Primary Examiner* — Regina M Yoo

(57) ABSTRACT

A deodorant for treating sediment in-situ, a deodorizing method and associated facilities. The deodorant is a calcium nitrate solution with a mass percentage of 14.32% to 52.49%. The deodorizing method comprises: (a) determining acid volatile sulfides content and total organic carbon content of sediments to be deodorized, and calculating the dosage of calcium nitrate solution required for deodorization: (b) ploughing the bed of the treatment area by injection tines of a bioremediator and at the same time injecting calcium nitrate solution into the sediment; after the bioremediator has navigated forward, the trench sides of the ploughed furrows will collapse, thus encapsulating the calcium nitrate solution within the sediment. The facilities for deodorizing sediment in-situ are comprise 4 systems, namely an injection system, a storage system, two supply systems and a navigation system.

6 Claims, 2 Drawing Sheets

DEODORANT FOR TREATING SEDIMENT IN-SITU AND THE ASSOCIATED FACILITIES AND METHOD

BACKGROUND OF THE INVENTION

The present invention refers to biochemical deodorization or bioremediation of sediment. It describes a deodorant for treating sediments in-situ, in rivers, lakes and harbours, and the associated facilities and method.

Due to rapid development of urban areas and a relatively lagging in environmental protection measures, many rivers, lakes and harbours have been seriously polluted, thus causing such environmental problems as deteriorated water qualities, blackened sediments, suppressed ecology and serious malodor, etc.

Among the said environmental problems, odor is the biggest drawing much attention. The mechanism by which malodor is generated is described as follows: As organically polluted sediments underwater are usually in an anaerobic state, only anaerobic micro-organisms could exist and would make use of the sulfate radical in water as electron acceptor to degrade the organic pollutants. The following reaction occurs:

$$2CH_2O + SO_4^{2-} + 2H^+ \rightarrow H_2S\uparrow + 2H_2O + 2CO_2$$

($CH_2O$ represents the organic pollutants)
In the process, Acid Volatile Sulfides (AVS, mainly hydrogen sulfide) which emit bad odor is produced.

In recent years, governments of different countries have started to tighten their control over sources of pollution. As a result, pollution loads to such water bodies as rivers, lakes, harbours etc. have been declining year by year. However, as pollutants have been accumulated in sediments for many past years, sediments would still emit bad odor. The problem of bad odor becomes more evident particularly during low tide, when such sediments are exposed.

Conventionally, dredging has been often regarded as a method for deodorization. However, this does not work. The reason is that regardless of how advanced and efficient a dredging technology is, the polluted sediments would inevitably disperse in the course of dredging because they are fluffy in nature. Hence, even sediment thickness can be reduced after dredging, the exposed surface areas of the odorous sediment are still not. As a result, bad odor would persist. Up to date, no in-situ deodorizing technology has been disclosed save this, which sets out an important step to deodorize sediments in-situ under water.

BRIEF SUMMARY OF THE INVENTION

In view of the aforesaid disadvantages and deficiencies now present in the prior art, the present invention aims to provide a deodorant capable of deodorizing sediment in-situ.

Another object of the present invention is to provide a compatible deodorizing method.

A further object of the present invention is to provide a facility to be used together with the said deodorant and method.

The objects of the present invention are attained as follows:
The Deodorant

The deodorant is calcium nitrate solution having a mass percentage of 14.32%-52.49%, or more preferably having a mass percentage of 36.34%-45%. A solution with concentration lower than 36.34% will be weaker in its deodorizing effect, more prone to be dispersed or diffused and hence less long-lasting. Solution with concentration of 45% is near to saturation and any over-dosage of nitrate would merely lead to the wastage of the nitrate crystals from which the solution is prepared.

The Method

The method to deodorize sediments in-situ comprises the following steps:

(a) Determine the acid volatile sulfides (AVS) content and the total organic carbon (TOC) content in sediments to be deodorized; then derive a dosage of calcium nitrate solution required for deodorization;

Dosage of calcium nitrate in term of kg $Ca(NO_3)_2$ $$\text{per m}^3 \text{ of wet sediment} = 5.86 * \left(\frac{112}{165} * AVS + \frac{3}{35} * TOC\right)$$

wherein AVS and TOC are both in kg per $m^3$ of wet sediment.

(b) Plough the river-bed or sea-bed etc by using injection tines on a biochemical treatment vessel (hereinafter called bioremediator). Concurrently, inject calcium nitrate solution into the sediment. As the bioremediator moves forward, the trench sides of the ploughed furrows will collapse, thus encapsulating the calcium nitrate solution within the sediment.

If the river-bed (or sea-bed) to be deodorized is too undulated, it will be necessary to priorly evenize the bed before step (b). This is done by navigating the bioremediator over the bed for 1 to 2 times to plough the bed with injection tines. Should the undulation be excessive, replace the injection tines by a beam or a channel.

In step (b), if the depth of sediment is less than 0.5 m, the calcium nitrate solution should be injected at the depth of 0.2 m. If depth of sediment is greater than 0.5 m, the calcium nitrate solution should first be injected at a depth of 0.5-0.6 m and then at a depth of 0.2 m. 40% of the dosage should be injected at the greater depth 0.5-0.6 m while the rest is injected at the smaller. By injecting at two different depths, the calcium nitrate solution would be distributed more evenly in the sediment such that calcium nitrate and the organic pollutants will be brought in close contact with each other in a shorter period of time. The indigenous microbial communities will develop faster, thus effecting more efficient deodorization.

In step (b), the dosage required by a unit volume of sediment should be injected in not less than 2 phases. 60-70% of the dosage should be injected in the first phase and the remainder in second. Better effect could be achieved if the injection could be completed in 2 phases because time and effort would be saved and the chance of affecting water quality would also be reduced. If the depth of sediment reaches 0.75-1 m and/or if AVS content exceeds 3000 mg per liter of wet sediments, the dosage required by a unit volume of sediment may have to be injected in 3 phases. Around 40% of the dosage should be injected in the first phase, 38-40% in the second, and the remainder in the third phase. The specific number of injection phases required should be determined according to field investigations.

In step (b), the bioremediator should traverse each treatment area 4 times during each phase of injection. If the depth of sediment is less than 0.5 m, ¼ of the dosage for the current phase should be injected each time at a depth of 0.2 m. If however the depth of sediment is greater than 0.5 m, the dosage should be injected at a depth of 0.5-0.6 m during the first phase, and at a depth of 0.2 m during the second and the third phases. Every time, ¼ of the dosage for the respective current phase should be injected. The purpose of the multiple times of injection is to ensure that the entire river-bed (or sea-bed) would evenly receive the calcium nitrate solution.

There should be an interval of 3 weeks after each phase of injection and before any subsequent phase of injection is carried out. An interval shorter than that may not be sufficient for the bioremediation process for breaking down the odorous pollutants. On the other hand, too long an interval will lead to unnecessarily prolonged treatment cycle and hence increasing project costs.

In step (b), the tilt angle (i.e. angle of level elevation) of the injection tines should be maintained at 45° to 50° to horizontal. This angle will ensure that the injecting nozzles will point slightly downwards so that the risk of spilling out calcium nitrate solution either downwards or upwards could be greatly reduced.

In step (b), calcium nitrate solution will be injected during the slow motion of the bioremediator, kept at about 0.2-0.4 m/s. The bioremediator will stop to move forward once every 100-150 m treatment "band" is covered. The injection tines will then be lifted up above water and the nitrate injection system will be immediately switched over to supplying sea water. This is to prevent the sediment particles from falling back into and clogging the injection nozzles. At the same time, crew members will manually remove all rubbish that sticks to the injection tines. After that, the bioremediator will move back to its original position, then shift laterally for 2 m and thereafter proceed with another course of injection.

The Facilities

The deodorizing facilities which are used together with the said deodorant and the said method are the bioremediators. The bioremediators could be one or more vessels not self-propelling but is to be hauled by winch, cables and anchors. A bioremediator is equipped with an injection system used to inject calcium nitrate solution into sediment.

A bioremediator comprises 4 systems, namely the injection system, a storage system, a supply system and a navigation system. They are described as follows:

The injection system should be provided at the rear part of the bioremediator. It comprises a lifting rack and the injection tines which dig furrows in sea-bed and inject chemicals. The lifting rack is connected to the injection tines and a control panel which controls the pushing down or lifting up of the tines. The injection tines are connected to two sources of supply: calcium nitrate solution and sea water. Switching between the sources could, as aforesaid, prevent sediment particles from clogging the injection nozzles.

The storage system should be provided in the middle part of the cabin of the bioremediator. It comprises one or more storage tank(s) for storing calcium nitrate solution.

The supply system should be provided in the middle and rear parts of the deck of the bioremediator. It comprises a water pump, flow control and monitoring devices and two piping systems, one to the storage tank(s) of calcium nitrate solution and another to sea water.

The navigation system should comprise the winch, the winding cable, the corner stands, a differential global position system (DGPS), a navigation route adjustment control device and an automatic navigation route recorder. The winch, provided at center of the deck of the bioremediator, will be powered by a generator. The winding cables which are tied to anchors via the stands at four corners of the vessel will provide the force to move the vessel.

The Mechanism and Monitoring Parameters

The mechanism of deodorizing is as follows:

During deodorizing treatment, calcium nitrate, with greater oxidant potential (than sulfide), is injected into sediments so that the odorous hydrogen sulfide would be quickly oxidized into sulfates. During such a process, the following reaction is resulted:

$$5HS^- + 8NO_3^- + 3H^+ \rightarrow 5SO_4^{2-} + 4N_2 + 4H_2O$$

Thereafter, the micro-organisms will continue to use calcium nitrate as electron acceptors to further degrade organic pollutants, producing harmless and odorless gases as shown below:

$$5CH_2O + 4NO_3^- + 4H^+ \rightarrow 2N_2\uparrow + 7H_2O + 5CO_2\uparrow$$

Wherein $CH_2O$ represents organic pollutants

Before and after treatment, various parameters of the sediment shall be monitored to evaluate the effect of deodorization, as shown in Table 1.

TABLE 1

Parameters for evaluating effect of deodorizing treatment of sediment and the reasons for selecting the parameters

| Parameters for evaluating the effect of treatment | Why chosen | The desired treatment results |
|---|---|---|
| Acid Volatile Sulfides (AVS) | This parameter is used to determine the magnitude of bad odor. The higher the value, the more obnoxious is the odor. | This value should be reduced by around 85 to 90% |
| Simultaneously Extracted Metals (SEM) | Simultaneously extracted metals refer to heavy metals simultaneously released when AVS is extracted. The ratio between SEM and AVS could be used to evaluate the biological toxicity of heavy metals in sediments. When SEM/AVS is smaller than 1, heavy metals in sediments are non-toxic. When SEM/AVS is greater than 1, heavy metals in sediments may be toxic to ecology. | The ratio of SEM/AVS should be smaller than 1 |
| Oxidation-Reduction Potential Value (Redox) | This value represents the degree of oxidation of sediment. If the value is −250 mV or above, formation of sulfides would be inhibited. To ensure that sediments are adequately oxidized, a value of −200 mV or above should be maintained. | This parameter value should be increased to −150 mV or above |

TABLE 1-continued

Parameters for evaluating effect of deodorizing treatment of sediment and the reasons for selecting the parameters

| Parameters for evaluating the effect of treatment | Why chosen | The desired treatment results |
|---|---|---|
| Microtox Solid-Phase Toxicity Test | This test is to determine the toxic effect of sediments on micro-organisms | The survival rate of micro-organisms should increase by 100% |
| Residual nitrate amount (%) | Residual nitrate in sediment will form a protective layer on top to prevent upward emanation of bad odor from layers below. It will also provide nitrate required for treating any new pollution sources in the future. | 10% to 25% of the original dosage amount |
| Total organic carbon (% w/w) | This parameter value is a quantitative indication of pollution. It is important to monitor this value in long term. | This parameter value should gradually decrease (decreased by 10% within one year) |

SUMMARY OF FEATURES

To summarize, in comparison with all other treatment technologies of the past, the present invention stands out in the following aspects:

1. This method deodorizes sediment in-situ. Sediment will not be required to be dredged priorly and disposed at elsewhere. Accordingly, land and spaces will be saved and the secondary pollution caused by dredging will not arise.

2. The deodorizing method is simple and easy to operate. The deodorant for deodorization is low in costs and therefore suitable for large scale application.

3. The deodorizing method is effective in overall improvement of all ecological environments. It could effectively reduce the formation of acid volatile sulfide (AVS), thereby suppressing bad odor. It could also effectively reduce the content of other pollutants (such as heavy metals, organic substances and oil products) commonly found in sediments. The method could reduce toxicity of sediments and therefore contribute significantly to the improvement of the overall environment. Besides, the method could also transform blackened sediments into yellowish sand grain texture, reduce turbidity of water and increase the amount of dissolved oxygen in water. It will therefore improve water quality indirectly. The method could be widely applied to seriously polluted waters such as rivers, coasts, lakes, harbours, etc.

4. The effect of deodorizing will be long lasting. Certain amount of deodorant will be left in sediments to meet the need of new pollutants.

Figure 1:
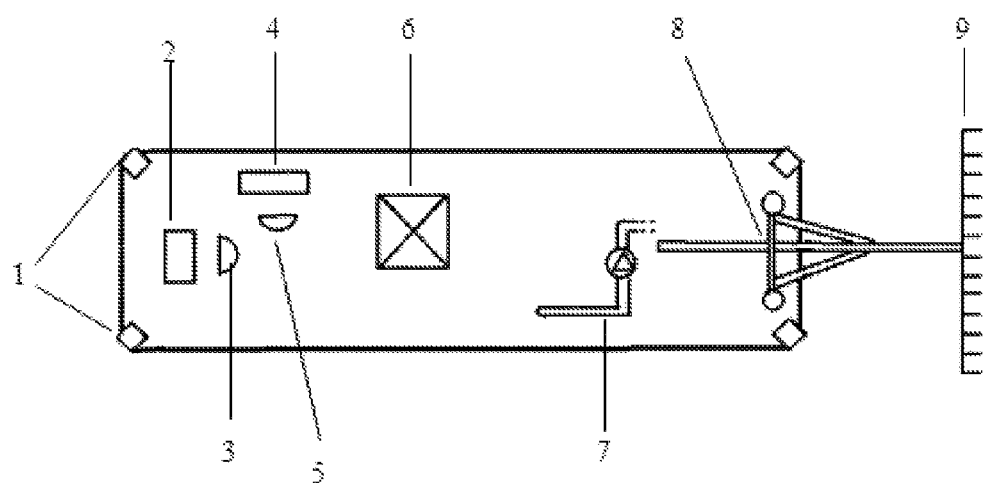
FIG. 1 is the plan view of an overall design of the bioremediator.

In the figures: 1—corner stands for winding cables; 2—computer display screen with navigation control panel; 3—primary steering seat; 4—secondary computer display screen with injection control panel; 5—secondary steering control seat; 6—winch and generator; 7—supply piping system; 8—lifting rack; 9—injection tines; 10—winding cable; 11—storage tanks; 12—DGPS antenna (of differential global positioning system); 13—connecting to (injection tines); 14—sea water.

DETAILED DESCRIPTION OF THE INVENTION

The present invention is further described in detail below with reference to the following projects (and the accompanying drawings). However, description of the present invention herein should not be taken as limiting.

Project

Embodiment 1

Location of Operation: Kai Tak Approach Channel in Hong Kong

Key information about the location of operation: Extent of treatment area: 4 hectares (40,000 m$^2$); Depth of sediment: 0.75 m; Major pollutants: household sewage, industrial waste water and crude oil pollution. Key procedures undertaken are described below:

(1) Baseline Monitoring

Sediments from the Kai Tak Approach Channel was sampled and analyzed. The following figures were obtained: AVS content was 4,000 mg per 0.001 m$^3$ of wet sediments, TOC content was 15,000 mg per 0.001 m$^3$ of wet sediments.

(2) Pre-Dredging

Around a hectare of sea-bed near a large box-culvert outfall has been raised above the general sea-bed level due to serious silting. That area was pre-dredged and then smoothened by using bioremediator, prior to injection treatment.

(3) The Injection Treatment

Firstly it was calculated that the amount of calcium nitrate to be injected should be 23.5 kg per m$^3$ of wet sediments. In actual practice, calcium nitrate solution with a mass percentage of 45% was used for the injection. In the first phase of injection, 40% of the dosage was injected at a depth of 0.6 m. In the second phase of injection, 40% of the dosage was injected at a depth of 0.2 m. In the third phase, the remaining 20% of the dosage was injected at a depth of 0.2 m. There was an interval of 3 weeks between each phase of injection. During each phase of injection, the bioremediator traversed over each area 4 times and the injection amount each time was ¼ of the dosage at the current phase.

During injection, the bioremediator travelled along a linear path at a speed of 0.2 m/s. The tilt angle of the tines was 45° to 50°. The injection tines (9) were lowered down into the specified depths to inject calcium nitrate solution. The bioremediator stopped navigating once every 100-150 m had been reached. The injection tines (9) were then lifted up and the supply system was immediately switched over to sea water. Rubbish hooked on to the injection tines (9) was not much, and was removed. After that, the bioremediator continued to navigate and proceed with another course of injection.

Figure 2:
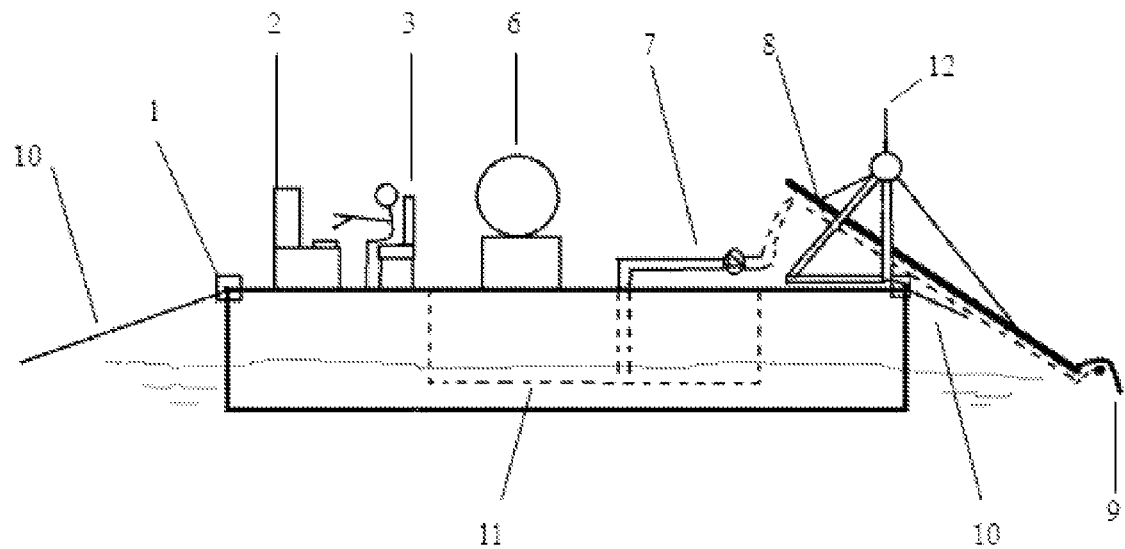
FIG. 2 is the side view of an overall design of the bioremediator.
Figure 3:
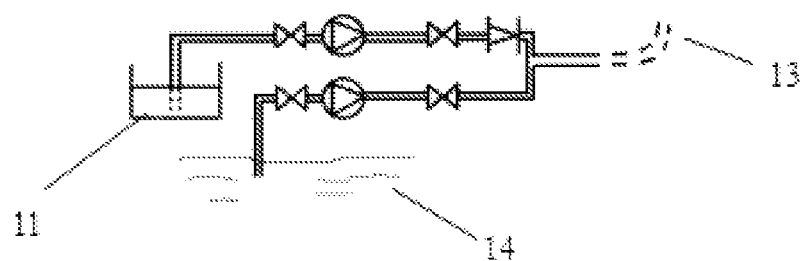
FIG. 3 is a schematic illustration of the supply system of the bioremediator.

The bioremediator used is illustrated in FIG. 1 to FIG. 3. The bioremediator was a vessel not self-propelled but hauled by using winch (6) and winding cables (10). The bioremediator was provided with an injection system which injected calcium nitrate solution into sediments. Besides, the bioremediator was also provided with a storage system and a supply system.

The injection system was provided at the rear part of the bioremediator and comprised a lifting rack (8) and injection tines (9). The lifting rack (8) was simultaneously connected to the injection tines (9) and a control panel (4) of the injection system. The injection tines (9) were simultaneously connected to two piping systems. As illustrated in FIG. 3, one system linked to the storage tanks (11) for supplying calcium nitrate solution and the other to sea water (14). Switching between the two supply systems could prevent sediment from clogging the injection nozzles. The storage system was provided in the middle part of the cabin of the bioremediator. The system comprised 3 storage tanks (11) for storing calcium nitrate solution.

The chemical supply system was provided in the middle and rear parts of the bioremediator. It comprised a water pump, a flow monitoring instrument and two piping systems, one to the injection system and the chemical storage system and the other to the injection system and sea water (14).

The navigation system comprised the winch (6), the winding cables (10), corner stands (1), a differential global position system (DGPS) (12), a navigation route adjustment device, and an automatic navigation route recorder. The winch was provided at center of the deck of the bioremediator and the winding cables were tied to anchors via the corner stands at four corners of the bioremediator. The anchors were sunk underwater and fixed firmly in position.

Projects

Embodiments 2 & 3

Except otherwise stated, in Table 2 Projects (Embodiments 2 and 3) were substantially same as Project (Embodiment 1).

TABLE 2

|  | Embodiment 1 | Embodiment 2 | Embodiment 3 |
| --- | --- | --- | --- |
| Deodorization Location | Kai Tak Approach Channel in Hong Kong | Shing Mun River in Hong Kong | Sam Ka Tsuen Typhoon Shelter in Hong Kong |
| Extent of Treatment Area (hectare) | 4 | 20 | 1.5 |
| Depth of Sediment to be Treated (m) | 0.75 | 0.5-1.0 | 0.5 |
| Major Pollutants | Household sewage, industrial waste water and crude oil pollution | Household sewage and industrial waste water | Household sewage |
| Number of Injection | 3 | 2-3 | 2 |
| Effects of treatment | | | |
| Acid Volatile Sulfides (AVS) | 4000 mg before treatment; reduced by at least 97% after treatment | 1800 mg before treatment; reduced by at least 98% after treatment | 1500 mg before treatment; reduced by at least 95% after treatment |
| Oxidation-Reduction Value (Redox) | About −100 mV after treatment | About −100 mV after treatment | About −150 mV after treatment |
| pH value | 6-8 | 6-8 | 6-8 |
| Residual Calcium Nitrate Amount | Not less than 25% of the injection dosage | Not less than 30% of the injection dosage | Not less than 20% of the injection dosage |
| Toxicity of Sediment | According to the results of a toxicity test (Microtox), toxicity of sediments was reduced by half. | According to the results of a toxicity test (Microtox), toxicity of sediments was reduced by half. | According to the results of a toxicity test (Microtox), toxicity of sediments was reduced by half. |
| Conclusion on effectiveness | Bad odor was removed; Sediments took the form of yellowish sand grain texture. | Bad odor was removed; Sediments took the form of yellowish sand grain texture; Water quality was improved; Ecological | Bad odor was removed; Sediments took the form of yellowish sand grain texture; Water quality was improved; Ecological |

TABLE 2-continued

| Embodiment 1 | Embodiment 2 | Embodiment 3 |
|---|---|---|
| | environment was notably improved 6 months after treatment. | environment was notably improved 6 months after treatment. |

Note:
Due to short term operation, the content of total organic carbon in sediment was not used to evaluate treatment effect directly.

The above embodiments are the more preferred embodiments of the present invention. However, description of the present invention is not limited by the above embodiments. Any other alterations, modifications, substitution, combinations and simplification not deviated from the spiritual essence and principle of the present invention are all equivalent replacement which should fall within the scope of protection of the present invention.

The invention claimed is:

1. A method to deodorize sediment in-situ using a deodorant in the form of a calcium nitrate solution having a mass percentage of 14.32%-52.49%, or a mass percentage of 36.34%-45%, and specifically, the method comprises the following steps:
   (a) determining acid volatile sulfides (AVS) content and total organic carbon (TOC) content in sediments under water, and then calculating a dosage of the calcium nitrate solution required;
   (b) ploughing a treatment river-bed or sea-bed by injection tines of a bioremediator; and at the same time, injecting the calcium nitrate solution into the sediment; and after the bioremediator has navigated forward, the trench sides of furrows ploughed will collapse and encapsulate the calcium nitrate solution within the sediment for subsequent biological treatment process.

2. The method to deodorize sediment in-situ as in claim 1, and more specifically in step (a), the dosage of calcium nitrate solution required for deodorization should be calculated according to the following formula:

$$\text{amount in kg of calcium nitrate to be injected per m}^3 \text{ of wet sludge} = 5.86 * \left( \frac{112}{165} * AVS + \frac{3}{35} * TOC \right)$$

wherein AVS and TOC are both in kg per m$^3$ of wet sludge.

3. The method to deodorize in-situ sludge as in claim 1, and more specifically if the treatment river-bed or sea-bed to be deodorized is too undulated, to smoothen the treatment river-bed or sea-bed after step (a) and before step (b); navigating the bioremediator along the treatment river-bed or sea-bed for 1 to 2 times to plough the treatment river-bed or sea-bed with the injection tines.

4. The method to deodorize sediment in-situ as in claim 1, and more specifically in step (b), if depth of the sediment is smaller than 0.5 m, injecting the calcium nitrate solution at a depth of 0.2 m; and if depth of the sediment is greater than 0.5 m, first injecting the calcium nitrate solution at a depth of 0.5-0.6 m and then injecting at a depth, of 0.2 m, wherein 40% of the dosage is injected at the depth of 0.5-0.6 m while the dosage remaining is injected at the depth of 0.2 m;
   or, in step (b), the dosage required by a unit volume of sediment is injected in 2 phases; 60-70% of the dosage is injected in first phase and the dosage remaining is injected in the second phase; and, if the depth of sediment reaches 0.75-1 m and/or if the AVS content exceeds 3000 mg per 0.001 m$^3$ of wet sediments, the dosage required by a unit volume of sediment is injected in 3 phases: around 40% of the dosage is injected in first phase, 38-40% of the dosage is injected in the second phase, and the dosage remaining is injected in the third phase; there is an interval of 3 weeks after each phase of injection and before any subsequent phase of injection is carried out.

5. The method to deodorize sediment in-situ as in claim 1, and more specifically characterized in that, in step (b), the bioremediator traverses over each treatment area 4 times during each phase of injection; if the depth of sediment is smaller than 0.5 m, ¼ of the dosage of calcium nitrate solution for the current phase is injected at a depth of 0.2 m each time; if the depth of sediment is greater than 0.5 m, the dosage is injected at a depth of 0.5-0.6 m during the first phase, and at a depth of 0.2 m during the second and the third phases; ¼ of the dosage for the current phase is injected each time.

6. The method to deodorize sediment in-situ as in claim 1, and more specifically, in step (b), the tilt angle of the injection tines is 45°-50° during injection.

* * * * *